July 27, 1943.  P. C. P. BOOTY  2,325,578
METHOD OF AND APPARATUS FOR APPLYING SWATCHES
Filed Jan. 25, 1941   7 Sheets-Sheet 1

Inventor:
Philip C. P. Booty
By: Leslie W. Frier
Attorney.

July 27, 1943.   P. C. P. BOOTY   2,325,578
METHOD OF AND APPARATUS FOR APPLYING SWATCHES
Filed Jan. 25, 1941   7 Sheets-Sheet 2

Inventor:
Philip C. P. Booty
By: Leslie W. Frier
Attorney

July 27, 1943.  P. C. P. BOOTY  2,325,578
METHOD OF AND APPARATUS FOR APPLYING SWATCHES
Filed Jan. 25, 1941   7 Sheets-Sheet 3

Inventor:
Philip C. P. Booty
By: Leslie W. Trine
Attorney

July 27, 1943.  P. C. P. BOOTY  2,325,578
METHOD OF AND APPARATUS FOR APPLYING SWATCHES
Filed Jan. 25, 1941  7 Sheets-Sheet 5

Inventor:
Philip C. P. Booty
By: Leslie W. Frick
Attorney

July 27, 1943. P. C. P. BOOTY 2,325,578
METHOD OF AND APPARATUS FOR APPLYING SWATCHES
Filed Jan. 25, 1941 7 Sheets-Sheet 6

Inventor:
Philip C. P. Booty
By: Leslie W. Frick
Attorney

July 27, 1943.   P. C. P. BOOTY   2,325,578
METHOD OF AND APPARATUS FOR APPLYING SWATCHES
Filed Jan. 25, 1941   7 Sheets-Sheet 7

Inventor:
Philip C. P. Booty
By: Leslie W. Fricke
Attorney

Patented July 27, 1943

2,325,578

UNITED STATES PATENT OFFICE 2,325,578

METHOD OF AND APPARATUS FOR APPLYING SWATCHES

Philip C. P. Booty, Chicago, Ill., assignor to Leslie W. Fricke, Chicago, Ill.; Dot Luella Fricke executrix of said Leslie W. Fricke, deceased Application January 25, 1941, Serial No. 375,902

26 Claims. (Cl. 216—55)

My invention relates to an improved method of applying swatches, particularly of fabric or other porous material, to catalog or other mounting sheets, and it relates also to an improved apparatus by means of which the method may be conveniently carried out.

Many attempts have been made heretofore to apply automatically by mechanical means samples or swatches of various fabrics to catalog display cards and other mounting sheets. Although some mechanical means have been employed for some of the steps in connection with the application of the swatches, such as applying glue to the mounting sheets and feeding the sheets onto traveling tapes, so far as I know no satisfactory or successful, automatic and mechanically operating mechanism has been devised for taking the swatches one by one out of the supply magazines and transferring them to the exact desired positions on the mounting sheets. One of the main objects of my invention is to provide an apparatus adapted to withdraw with certainty one swatch at a time from its supply mechanism and transfer it to the exact position desired on the mounting sheet.

In carrying out my invention, I stack the swatches of porous material in a supply magazine and behind each swatch I place a sheet of material impervious to air, such as a thin sheet of paper, so that when a suction head is applied to the exposed face of a swatch the paper at the other face of the swatch, in cooperation with the swatch itself, will seal the suction opening in the head, and the swatch will be reliably and securely gripped and withdrawn from the supply magazine, and then transferred, without any sliding or skidding movement by it relative to the head, to the position desired on the mounting sheet.

Preferably a suitable adhesive, such as liquid glue, is used to secure the swatches to the mounting sheets, and it is another object of my invention to provide an apparatus having a table over which the mounting sheets may travel from one end thereof to the other, and be stopped at one station to have the glue applied and be stopped at another station to have the swatches applied, such an arrangement doubling the capacity of the apparatus over one wherein the glue and swatches are applied at a single station.

Another object of my invention is to provide improved stop means for momentarily checking movement of the mounting sheets at the glue and swatch-applying stations, said stop means being so designed that a free or ungripped portion of a swatch about to be applied to a mounting sheet will be deposited at one station onto spots or areas of the sheet to which the glue has been applied, while glue is being applied to the next following sheet at the glue applying station. Preferably also the stop means is so designed that considerable adjustment of it may be made so that the swatches may be applied at any position desired, for example, either near the top edge or the lower edge of a mounting sheet.

It is a further object of my invention to provide novel, simply constructed and positively operating means for insuring the deposit of the proper amount of glue at the spots desired on the mounting sheets.

In its preferred form, my invention contemplates the simultaneous application of a plurality of swatches to a mounting sheet. The swatch supply magazines must be so located that they do not interfere with the travel of the mounting sheets from one end of the apparatus to the other, or with the gluing apparatus or any other parts of the apparatus. In order to keep the design of the apparatus as simple as possible, and bearing in mind that the sheet of paper associated with each swatch must be on top of the swatch when the swatch is secured to the mounting sheet so as not to interfere with the securing of the swatch in place, I have found it desirable to mount the supply magazines at one side of the table, over which the mounting sheets travel, and to withdraw the swatches from the bottoms of the stacks in their supply magazines. I have found it desirable also to pull the swatches directly downwardly out of the supply magazines because such a movement does not interfere with the swatches stacked above. For these reasons I prefer to mount the suction heads on an arm adapted to swing back and forth through an arc of about 90°, that is to say, from a position under the supply magazines to the swatch applying station and return. It is another object of my invention to provide an arrangement for swinging the arm as aforesaid and for raising and lowering it at the swatch supply magazines and also at the swatch applying station.

As has been stated, the swatches are gripped by suction heads; and it is a further object of my invention to provide positively acting means for applying suction to the swatches when the suction heads come into contact with them in the supply magazines and to cut off the suction immediately following the attachment of the swatches to the mounting sheets.

In order to insure positive withdrawal of a swatch from its supply magazine by the suction head making contact therewith, and to grip the swatch securely so that it will not slide or skid relative to the suction head from the time it is gripped until it is attached to the mounting sheet, I have found it highly desirable to draw the swatch down into the suction openings of the head to a substantial extent to insure a dependable grip, but that results in the margins of the gripped switch being turned upwardly and wrinkled or puckered to a substantial extent. Preferably the suction medium is applied approximately to the rear half of a gripped swatch, the suction head being so designed that the forward edge of the swatch projects a substantial distance forwardly of the head. It is another object of my invention to provide automatically operating means adapted to flatten the forward or free portion of a gripped swatch preparatory to the securing of the swatch at its said forward or free portion to the mounting sheet.

It is another object of my invention to provide automatically operating means for applying pressure to the forward or free portion of the swatch upon the swatch arriving at its proper position on the mounting sheet and to press its said forward or free portion into intimate contact with the spots on the mounting sheet to which glue had previously been applied. Preferably the pressure applying mechanism and the swatch flattening mechanism are timed to operate so that the flattening means will tend to guide the free or forward portion of a swatch under the pressure device, and preferably also the pressure device draws the forward or free portion of the swatch down around the forward edge of the suction head, the forward extremity of the swatch being pressed in a smooth condition onto the mounting sheet, and all before the grip on the swatch is released or any skidding or sliding of the swatch relative to the head takes place.

The invention consists in the novel constructions, arrangements and devices to be hereinafter described and claimed for carrying out the above stated objects and such other objects as will appear from the following specification, and it consists further in the improved method of applying swatches of porous material to catalog sheets or the like to be hereinafter described and claimed.

The invention is illustrated in certain preferred embodiments in the accompanying drawings, wherein—

Fig. 8 is a sectional view of the stop mechanism taken on the line 8—8 of Fig. 7;

Fig. 9 is a sectional view on an enlarged scale taken on the line 9—9 of Fig. 8 showing one of the stop fingers;

Fig. 10 is a sectional view of the glue applying mechanism taken on the line 10—10 of Fig. 4;

Fig. 11 is a sectional view taken on the line 11—11 of Fig. 4 showing the means for rotating the glue roll;

Fig. 12 is a side elevational view of the lower end.

Fig. 14 is a sectional view on an enlarged scale of one of the glue receiving and applying fingers;

Like characters of reference designate like parts in the several views.

In carrying out my invention, swatches of fabric or other porous material are arranged in stacks alternately with sheets of material impervious to the suction medium such as paper.

Figure 1:
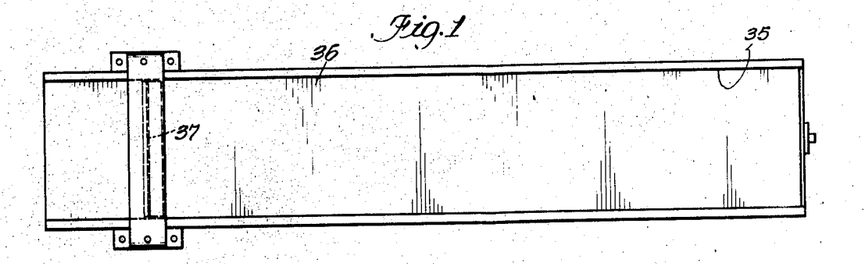
Fig. 1 is a plan view on a reduced scale of an apparatus suitable for cutting layers of fabric alternately arranged with layers of paper into swatches of the desired size.
Figure 2:
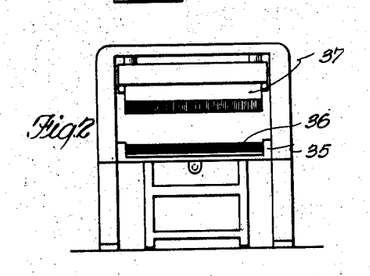
Fig. 2 is an end view of the apparatus shown in Fig. 1.
Figure 3:
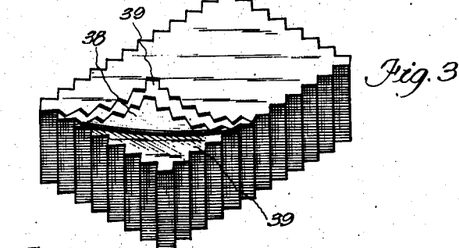
Fig. 3 is a perspective view of a stack of swatches alternately arranged with sheets of paper ready for placing in one of the magazines of the swatch applying apparatus.

Referring to Figs. 1 to 3, a layer of cloth from which the swatches are to be cut is placed on the table 35 of the swatch cutting apparatus and a layer of paper is placed thereover. In a similar manner other layers of cloth and paper are placed on the table until the cloth and paper make a pile 36 say one to two inches high. Care is taken to keep the cloth and paper free of wrinkles, and any suitable clamping means may be used to secure the pile against shifting laterally relative to the table and to prevent the cloth and paper layers from shifting relative to each other. The pile of cloth and paper is then fed under a knife 37 having a serrated cutting edge and operating in the manner of a guillotine, the pile of cloth and paper being cut into strips of the desired width. After a number of such strips have been cut off, the strips are placed longitudinally on the table and secured against slippage in any desired manner and the ends thereof are progressively cut off to provide swatches of the desired size. A stack of swatches cut in the manner described is shown in Fig. 3, the layer 38 being the swatch and the layer 39 being the sheet of paper disposed thereover.

Figure 4:
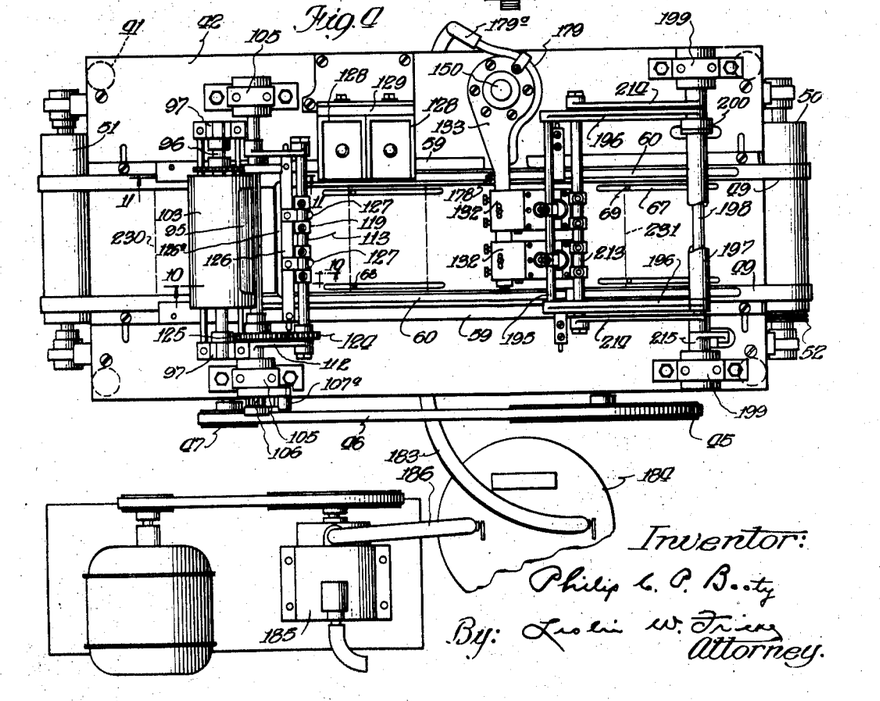
Fig. 4 is a plan view of my swatch applying apparatus showing in particular the parts mounted on the upper deck or table thereof.
Figure 5:
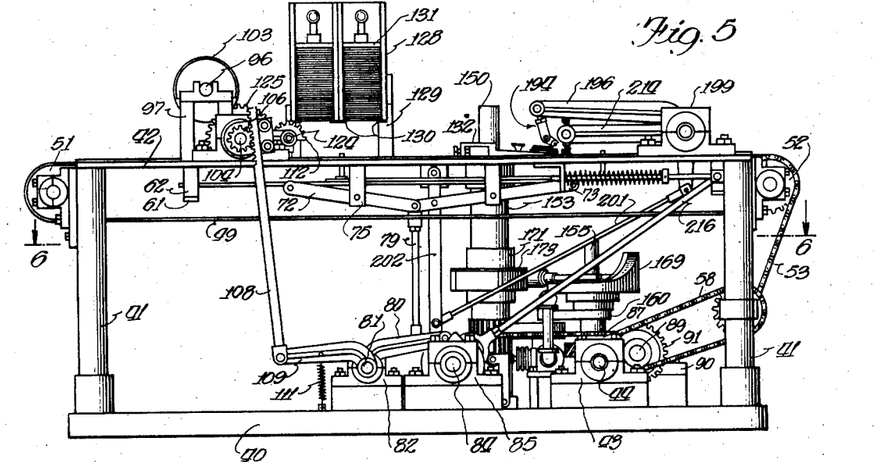
Fig. 5 is a side elevational view of the apparatus with certain parts removed for clearness of illustration.
Figure 6:
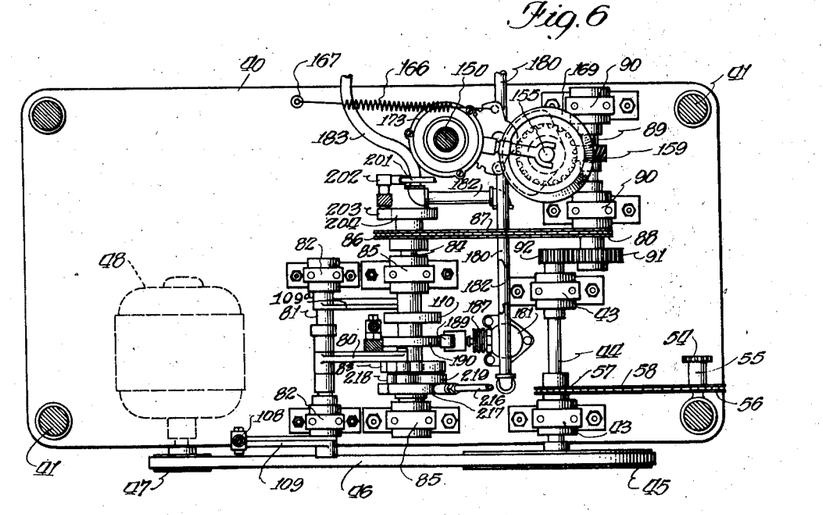
Fig. 6 is a sectional view taken on the line 6—6 of Fig. 5 illustrating in plan the various parts mounted on the lower deck or base of the apparatus.

As shown in Figs. 4 to 6, the frame of my swatch applying apparatus comprises a base 40 provided with four corner posts 41 which support an upper deck or table 42. The base carries a pair of bearings 43 which support a main drive shaft 44 carrying a pulley 45 connected by a belt 46 operating over a pulley 47 of a motor 48. The mounting sheets are fed onto the left end of the table 42 and pass thereover from left to right. For carrying the mounting sheets over the table, I provide a pair of endless tapes 49 which pass over or around a driven roller 50 and an idling roller 51 journaled in suitable bearings as shown. The tapes may be of fabric or any suitable material and the surface of the roller 50 is preferably of rubber or other material adapted to prevent slippage of the tapes on that roller. The roller 50 has a sprocket 52 fixed to it. A chain 53 operates over the sprocket 52 and a sprocket 54 fixed to a stub shaft 55 journaled in a support carried by the frame (Fig. 6). A sprocket 56 is fixed to the stub shaft 55 and a sprocket 57 is fixed to the main drive shaft 44, a chain 58 operating over said sprockets. The arrangement is such that the roller 50 turns clockwise. As shown in Fig. 4, guide strips 59 are adjustably mounted on the table 42, adjacent the outer edges of the respective tapes 49, to accommodate mounting sheets of different widths. Strips 60 of spring material are mounted above the respective tapes 49 and are adapted to hold the mounting sheets carried by the tapes firmly against the tapes so that no undesired slippage of the sheets on the tapes will occur.

The means for stopping the mounting sheets at the gluing station and the swatch applying station, the means for applying the glue to the mounting sheets, the means for gripping the individual swatches at the supply magazines and transferring them to the swatch applying station over the mounting sheets, the means for flattening the swatches preparatory to securing them to the mounting sheets, and the means for pressing them onto the glued spots of the mounting sheets will now be described in the order mentioned.

*Stop means for mounting sheets*

Figure 7:
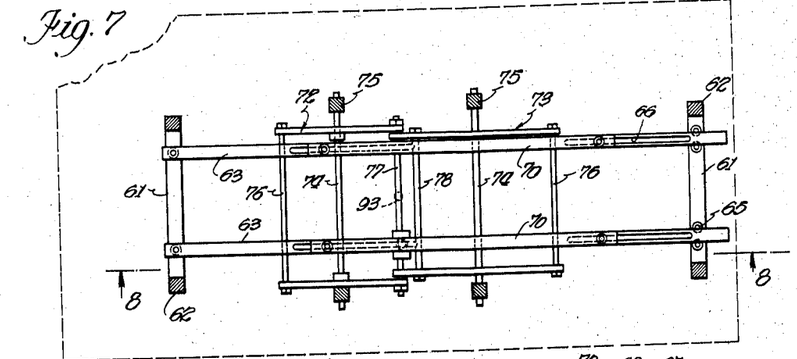
Fig. 7 is a plan view, taken just under the table, of the parts I employ for stopping the mounting sheets at the glue and swatch applying stations, the table being outlined in dotted lines.
Figures 8, 9, 10, 11, 12, 14:
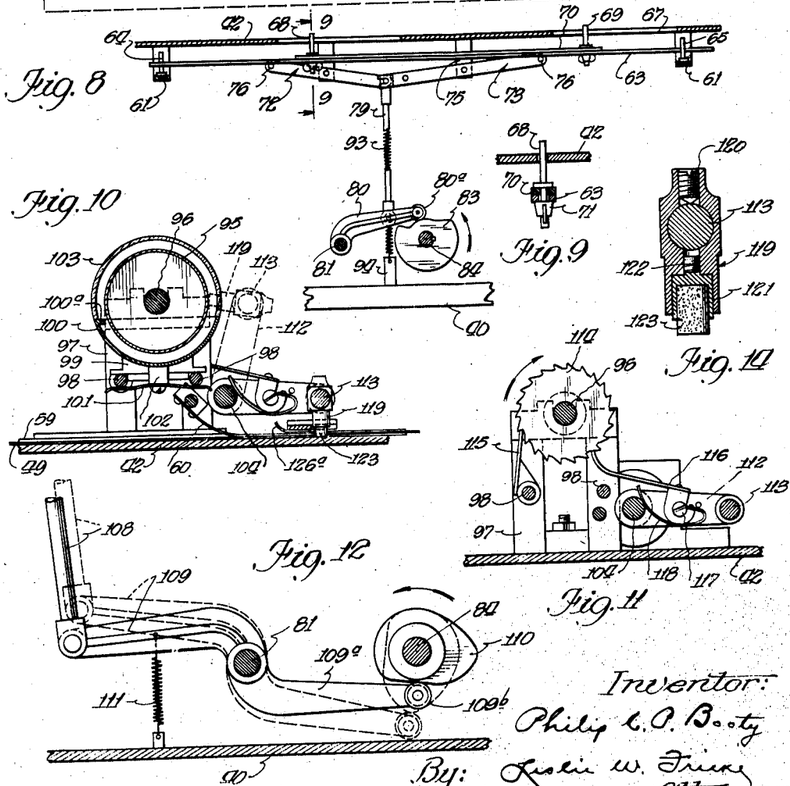

The means for stopping the mounting sheets at the gluing station and the swatch applying station is best shown in Figs. 5 and 7 to 9. Cross bars 61 carried by downwardly extending posts 62 secured to the under side of the table 42 provide supports for two flat bars 63. The left cross support 61 is provided with upstanding fixed pins 64 which fit freely within openings of the bars 63. The right cross support 61 is provided with spaced fixed pins 65 between which the right ends of the bars 63 are freely disposed (Fig. 7). The bars 63 are slotted at 66 and the table 42 is slotted at 67 (Figs. 4 and 8). A pair of stops 68 and another pair of stops 69 in the form of upstanding studs are carried by two bars 70 which rest on the respective bars 63, there being one stop 68 and one stop 69 on each of the bars 70. As shown in Fig. 9, the lower ends of said stud-like stops extend through openings in the bars 70 and through the respective slots in the bars 63 and are threaded for engagement with a locking wing nut 71. By loosening the nuts 71, each bar 70 and the two stops carried thereon may be shifted as desired to bring the stops into the proper positions in the table 42.

Means is provided for lowering the stops so that their upper ends do not project above the upper surface of the table 42 at certain periods, and for raising the stops so that the mounting sheets will be stopped as desired at the glue applying and swatch applying stations, said means comprising frames 72 and 73 pivoted on cross rods 74 mounted in downwardly extending brackets 75 attached to the under side of the table 42. A cross rod 76 at the outer end of each frame bears against the under side of the main bars 63. The inner end of the frame 72 is provided with a tight fitting cross rod 77 which has a loose or lost motion connection with the adjacent ends of the side members of the frame 73. The side members of the frame 73 at their inner ends are also connected by a brace or tie rod 78. The rod 77 is connected by a link 79 with an arm 80 journaled on a counter shaft 81 which in turn is journaled in suitable bearings 82 carried by the base (Fig. 6). The free end of the arm 80 is provided with a roller 80a which bears against the edge of a cam 83 fixed on a cam shaft 84 journaled in bearings 85 carried by the base. The shaft 84 carries a sprocket 86 over which an endless chain 87 operates, the other end of said chain operating over a sprocket 88 fixed to a counter shaft 89 journaled in bearings 90 carried by the base. The counter shaft 89 carries a fixed gear 91 in mesh with a gear 92 fixed to the main drive shaft 44. Normally the shaft 84 turns counter-clockwise as indicated by the arrow (Fig. 8). A tension spring 93 connected at its upper end to the cross rod 77 and connected at its lower end to a post 94 carried by the base holds the roller 80a carried by the arm 80 firmly against the edge of the cam 83. As shown in Fig. 8, the roller 80a is in engagement with a low portion of the cam 83 resulting in the bars 63 being raised and the upper ends of the mounting sheet stops being projected above the upper surface of the table 42. It will be obvious that when the roller 80a is in engagement with a high portion of the cam that the adjacent or inner ends of the pivoted frames 72 and 73 will be raised and their outer ends will be lowered thereby lowering the stops even with or below the upper surface of the table 42.

*Glue applying means*

The means for applying glue to the mounting sheets is shown generally in Figs. 4 and 5 and in detail in Figs. 10 to 14. A glue roller 95 in the form of a hollow cylinder of brass or other suitable material is fixed to a shaft 96 journaled at its ends in bearings 97 mounted on the table 42. Two spaced cross rods 98 extend above the table and between the bearings 97. Feet 99 of a glue receptacle 100 in the form of a half cylinder rest on top of the cross rods 98. To hold the glue receptacle in place, I provide a turnable spring bar 101 on a post 102 fixed to the bottom of the glue receptacle, the spring bar being adapted to be swung so that its opposite ends bear against the under sides of the cross rods 98. One edge of the glue receptacle is turned in at 100a to provide means for limiting the thickness of the film of glue carried by the glue roller. A shield 103 of any suitable transparent material may be provided if desired over the glue roller.

Figures 13, 15, 16, 17, 18:
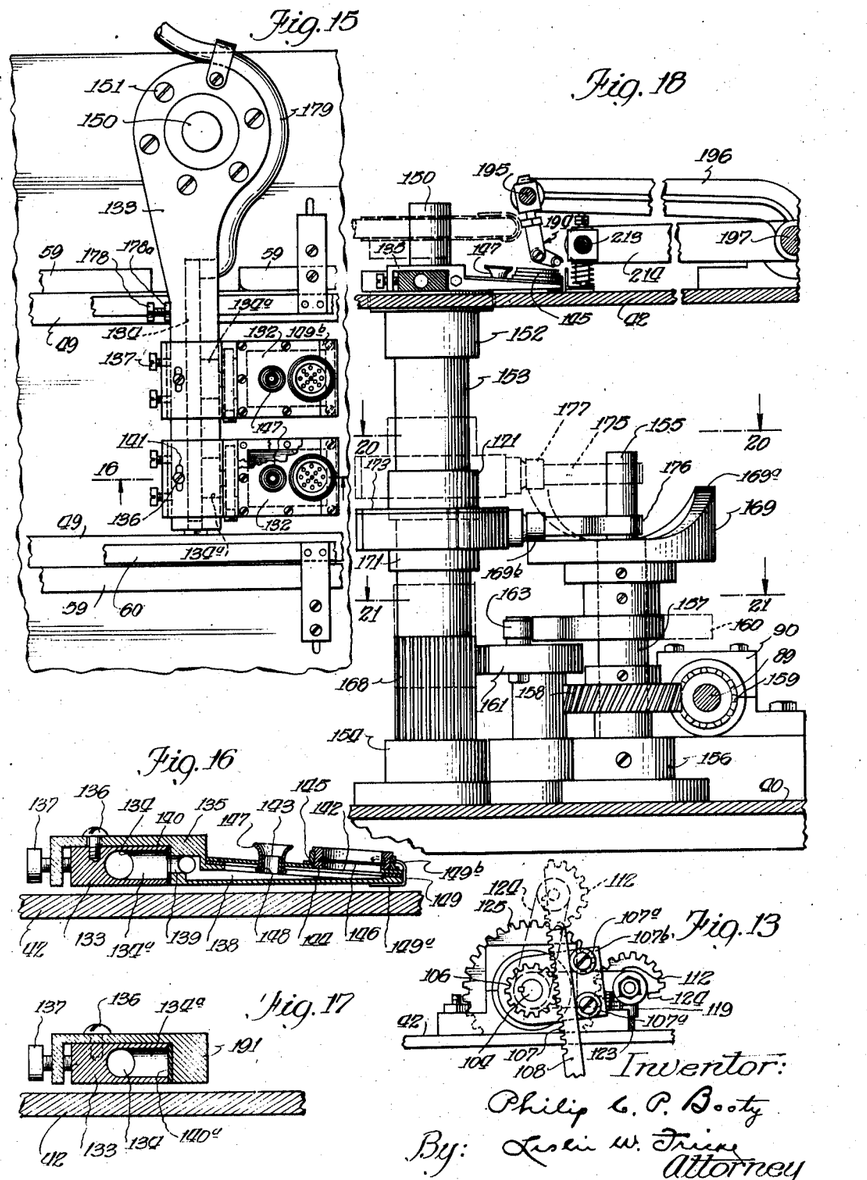
Fig. 13 is a side elevational view of the upper end of the means employed for operating the glue applying mechanism.
Fig. 15 is a plan view of the swinging arm and suction heads carried thereby which remove the swatches from their receptacles and deposit them in the desired positions on the mounting sheet.
Fig. 16 is a sectional view on an enlarged scale through one of the suction heads taken on the line 16—16 of Fig. 15.
Fig. 17 is a sectional view of a shut-off mechanism that may be employed in lieu of one of the suction heads when it is desired to apply a single swatch at a time.
Fig. 18 is a side elevational view of the means employed for operating the swinging arm carrying the suction heads, certain cooperating parts being also illustrated.

The means for turning the glue roller includes a rock shaft 104 journaled in bearings 105 mounted on the table. As best shown in Fig. 13, the shaft 104 has a gear 106 fixed to it and is engaged by a rack 107 provided at one side and on the upper end of a link 108, said rack being maintained in engagement with said gear 106 by rollers 107a carried by a mounting block 107b loose on the shaft 104. The lower end of the link 108 is pivoted to a rocker arm 109 fixed to the shaft 81, an arm 109a being also fixed to said shaft and carrying a roller 109b adapted to bear against the edge of a cam 110 fixed on the cam shaft 84. A tension spring 111 normally tends to turn the arms 109 and 109a so that the roller 109b is in engagement with its cam. The rock shaft 104 has fixed to it a pair of arms 112 between and in which is journaled a rock shaft 113. The shaft 96 carrying the glue roller has fixed to it a ratchet wheel 114, said shaft and ratchet wheel normally turning in the direction indicated by the arrow (Fig. 11), backward movement of the ratchet being prevented by a spring pressed pawl 115 swingingly mounted on one of the cross rods 98. The means for turning the glue roller includes a pawl 116 pivoted at 117 to the side of one of the arms 112, the free end of said pawl 116 being adapted to engage the teeth on the ratchet wheel 114. Said pawl 116 is maintained in engagement with the teeth of the ratchet wheel 114 by a spring 118 fixed at one end to the pawl and adapted to bear at its other end against the shaft 104. It will be apparent that when the arm 112 moves from the position shown in full lines to the position shown in dotted lines (Fig. 10) that the ratchet wheel 114 and shaft 96 will be turned in the direction indicated by the arrow at which time the pawl 115 rides over the edges of several teeth on the ratchet wheel, and that when the arm 112 moves back to its full line position the free end of the pawl 116 will drag over several teeth of the ratchet wheel which at that time will remain stationary.

Preferably the ratchet 114 is provided with a hunting tooth, that is to say, in dividing the total number of teeth on the ratchet by the number of teeth over which the pawl 115 rides when the ratchet is advanced by the other pawl there will be at least one extra tooth. With this arrangement a fresh surface on the glue roller 95 is always presented to the glue fingers now to be described.

The apparatus disclosed is intended to apply two swatches at a time and it is intended to press each swatch into contact with two glued spots on the mounting sheet. I provide therefore four glue applying fingers 119 on the shaft 113, the fingers being shown in detail in Fig. 14. Each finger is secured to the shaft 113 by a set screw 120. The lower end of each finger is recessed to receive a sleeve 121, the inner end of which is provided with a shank 122 having threaded engagement with the finger 119. A glue receiving and applying member 123 of felt or other suitable material, somewhat over-sized, is pressed into the open end of the sleeve 121, and, therefore, may be readily replaced whenever desired.

In the operation of the mechanism, the glue fingers 119 move from the position shown in full lines to the position shown in dotted lines (Fig. 10) traversing an arc of approximately 265°. The means for moving the glue fingers from one position to the other includes a gear member 124 fixed on the shaft 113 (Figs. 4, 5 and 13), said gear member 124 meshing with a stationary gear member 125 loose on the shaft 104. As shown in Fig. 13, the bottom edge of said gear member 125 is flat and bears against the top side of the table 42 thereby preventing rotative movement of said gear member. Since the arms 112 are fixed to the shaft 104 it will be apparent that when link 108 moves upwardly its rack 107 will rotate the shaft 104 in a counter-clockwise direction, and therefore the arms 112 will move upwardly from the full line position to the dotted line position (Fig. 10). As said arms 112 swing upwardly the gear member 124 fixed to the shaft 113 will cause said shaft to rotate counter-clockwise and the glue fingers 119, therefore, will be turned from the position shown in full lines to the position shown in dotted lines (Fig. 10), and of course when the link 108 and its rack move downwardly the glue fingers 119 will return to the full line position. It will be observed that the contact between the glue receiving and applying members 123 with the mounting sheets and with the surface of the glue roller 95 may be varied considerably by lengthening or shortening said members 123 or by adjusting the sleeves 121 with respect to the fingers 119. Since the glue fingers are turnable on the shaft 113, a further adjustment may be obtained by loosening the set screws 120 and tilting the fingers 119 to one side or the other on the shaft 113.

There is a tendency for the mounting sheets to stick to the glue applying members and to be raised therewith. To obviate such tendency I have provided a cross bar 126 (Fig. 4) mounted at its ends on the table. The bar 126 carries stripping fingers 127 which project between the glue applying fingers and since said stripping fingers are stationary they strip the glued mounting sheets from the glue fingers when the latter are raised. As shown in Fig. 4, I provide an inclined flange 126a on the cross bar 126 to facilitate entry of the forward edges of the mounting sheets under said bar.

*Swatch gripping and transfer mechanism*

As shown in Figs. 4 and 5, stacks of swatches and paper, like the stack shown in Fig. 3, are placed in magazines 128 secured to a support 129 mounted on the table 42. The magazines are closed at their sides and at the rear (Fig. 4) and they are mounted so that their lower ends terminate a substantial distance above the table (Fig. 5). Each magazine at its bottom is provided with spaced ledges 130 on which the lower end of the stack rests. A follower block or weight 131 is placed on the top end of each stack to maintain the swatches in the desired stacked relation. It will be obvious that a plurality of relatively short stacks of the swatches and paper may be inserted into the magazines through their open sides to build up stacks of substantial height. When stacked in the magazines a swatch always rests on the ledges 130 and is backed by a sheet of material impervious to air such as paper.

The swatches are withdrawn from the supply magazines and delivered to the desired positions over the mounting sheets by suction heads 132 carried by a swinging arm 133 (Figs. 4 and 15). Said arm is provided with an air or suction duct 134 which communicates with two outlets 134a. As shown in Figs. 15 and 16, each suction head comprises a yoke-like mounting portion 135 adapted to fit over the arm 133 and to be secured in position by set screws 136 and 137. Each head is provided with a suction chamber 138 which is provided with an inlet opening 139 surrounded by a gasket 140 and in communication with one of the suction outlets 134a in the arm. The screws 136 extend through slots 141 formed in the heads and the construction is such that each head may be moved outwardly or inwardly on the arm to the position desired and then locked in place by the screws 136 and 137, the latter drawing the head tightly against the gasket and providing an air-tight connection between the head and the arm. The upper wall of the suction chamber is provided with a main suction opening 142 and an auxiliary suction opening 143. The main opening 142 is surrounded by a ring 144 of rubber or other suitable material which is held in place by a surrounding supporting ring 145 soldered or otherwise secured to the upper face of the head. A perforated disc 146 is carried by the ring 144 as shown. The auxiliary opening 143 is surrounded by a cupped ring 147, preferably of flexible rubber, and is held in place by a rigid sleeve 148 which may be pressed into the position shown to secure the member 147 in the head. A swatch guide 149 is carried on each head adjacent the main suction opening 142. Said guide comprises a thin piece of metal having a bottom flange 149a soldered or otherwise secured to the bottom of the head, the guide being then turned up and over the top of the head to provide a top flange 149b which, as shown in Fig. 15, is cut away so as to fit closely about the adjacent portion of the ring 145. The purpose of the guide will be presently explained.

The arm 133 is adapted to be swung from the swatch applying station shown in Fig. 4 to bring the suction heads carried by the arm under the swatches in the supply magazines. In making such an excursion, the arm 133 first raises a short distance with respect to the table and then, after swinging backwardly raises a substantial distance to bring the suction heads into operative contact with the swatches in the magazines. Thereafter the arm moves downwardly a substantial distance before commencing to swing to the swatch applying station and finally moves downwardly just before the swatches are secured to the mounting sheets.

Figure 21:
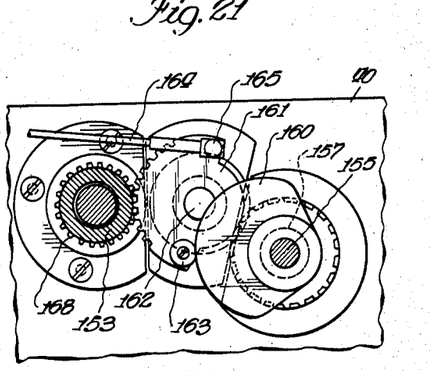
Fig. 21 is a sectional view taken on the line 21—21 of Fig. 18.
Figure 22:
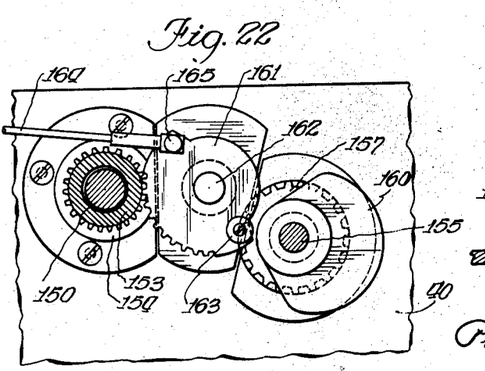
Fig. 22 is a view similar to Fig. 21 but showing the parts in a different relation.

The means for raising, lowering and swinging the arm as described is shown in Figs. 18 to 22. The arm swings about the axis of a post 150 and is secured by screws 151 to a flanged collar 152 fixed to a sleeve 153 slidably and rotatably mounted on the post 150. The lower end of said post is fixed in a flanged hub member 154 secured to the base 40. The lower end of a vertical post 155 is fixed in a hubbed member 156, also secured to the base. A sleeve 157 surrounds the post 155 and has fixed to it a worm wheel 158 in mesh with a worm 159 fixed on the shaft 89. A cam 160 is fixed on the sleeve 157 (Fig. 21). A segmental gear 161 is journaled on a vertically extending stub shaft 162 carried by the base. The member 161 carries a roller 163 adapted to bear against the edge of the cam 160. A link 164 is pivoted at 165 to the member 161, the other end of said link being connected to a tension spring 166 fixed at 167 to the base (Fig. 6). Said spring 166 and link 164 serve to maintain the roller 163, carried by the gear member 161, in contact with the working edge of the cam 160. As best shown in Fig. 21, the teeth on the gear member 161 mesh with a gear 168 cut into or fixed on the lower end of the sleeve 153. It will now be apparent that continuous rotation of the shaft 89 will oscillate the sleeve 153 on the post 150 which in turn will swing the arm carrying the suction heads over the table.

Figure 19:
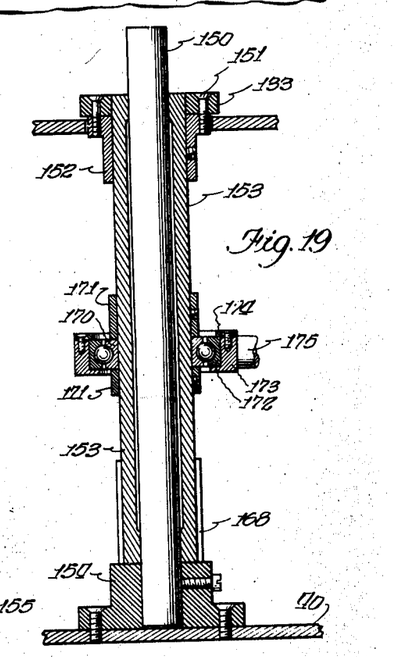
Fig. 19 is a sectional view of the supporting and operating means for the swinging arm.
Figure 20:
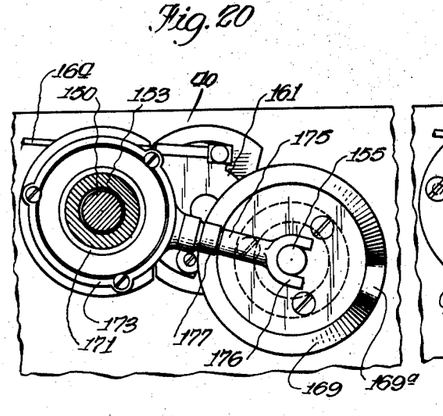
Fig. 20 is a sectional view taken on the line 20—20 of Fig. 18.

The means for raising and lowering the arm carrying the suction heads includes a cam member 169 fixed on the sleeve 157. As shown in Fig. 19, the sleeve 153 carries the inner race 170 of a ball bearing, said race being held in position on said sleeve between collars 171 fixed to the sleeve. The outer race 172 of the bearing is positioned within an annular flanged member 173 capped by a ring-like plate 174. The member 173 has a laterally projecting arm 175 which terminates in forked arms 176 which embrace the upper end of the post 155. A roller 177 carried by the arm 175 rides the top or cammed surface of the member 169. When the sleeve 157 turns, the cam member 169 also turns and since the roller 177 carried by the arm 175 attached to the sliding sleeve 153 rides the cam surface of the member 169, the sleeve 153 is raised and lowered, and without disengaging the teeth on the gear member 161 from the gear 168 on the sleeve 153. The parts are so arranged that the suction heads carried by the swinging arm 133 are in operative contact with the swatches in the magazines when the roller 177 is at the high spot 169a of the cam member 169, as shown in dotted lines in Fig. 18, and the suction heads are in the swatch applying position as shown in Fig. 15 when the roller 177 is at the low spot 169b of the cam member 169 as shown in full lines in Fig. 18. The high spot 169a and the low spot 169b of the member 169 are straight or flat for a length sufficient to introduce a pause in the raising and lowering of the suction heads at the extreme ends of their excursions. The edge of the cam 160 is also so shaped that there is a substantial pause in the swinging of the arm carrying the suction heads at each end of their excursion. When the suction heads are under the swatch magazines the cam 160 and the roller 163 are in the position shown in Fig. 22, and when the suction heads are at the swatch applying station the relation of said cam 160 and roller 163 is as shown in Fig. 21. It will be noted that when said parts are in the relation shown in Fig. 22 the roller 163 is spaced away from the edge of the cam 160 which is to provide for proper adjustment of the suction heads with respect to the swatches in the supply magazines. The arm 133 carries an adjusting screw 178 (Fig. 15) which may be set and locked in place by a nut 178a. When the arm 133 swings to the swatch receiving position the end of the screw 178 bears against a portion of the mounting bracket 129 (Fig. 5), the spring 166 (Fig. 6) operating to hold the adjusting screw of the arm tight against the mounting bracket.

The means for applying suction to the swatches will now be described. As shown in Figs. 4 and 15 the duct 134 is connected to a pipe 179 which leads to a flexible conduit 179a and which in turn leads to a pipe 180 (Fig. 6). The pipe 180 extends transversely across the base, then downwardly and into one side of a cut-off valve 181 (Fig. 6). A pipe 182 leads from the other side of said valve to one end of a flexible conduit 183, the other end of said conduit being connected with a partially evacuated tank 184 (Fig. 4). A motor driven vacuum pump 185 is connected by the conduit 186 with the vacuum tank. It will be understood that the pump 185 exhausts the air to a substantial extent from the tank 184, thus creating a suction in the line leading therefrom.

Figure 23:
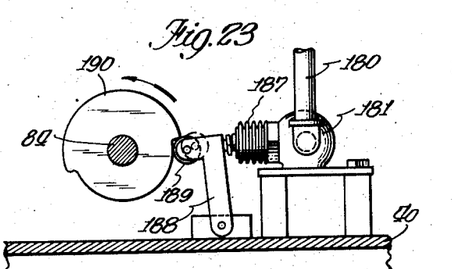
Fig. 23 is a side elevational view of the cam operated means for opening and closing the suction line.

The means for applying suction to the swatches and cutting it off is shown generally in Fig. 6 and in detail in Fig. 23. The valve 181 may be of any preferred construction. That illustrated is of the plunger operating type. The valve is mounted on a support carried by the base 40, the operating plunger being positioned horizontally and sealed within a flexible bellows 187 to prevent leakage. The lower end of a lever 188 is pivoted to the base and one side of the upper end thereof bears against a plate carried by the bellows, and a roller 189 is pivotally mounted at the other side thereof. The roller 189 bears against the edge of a cam member 190 fixed to the cam shaft 84. The cam 190 is set so that the valve plunger will be pushed inwardly to open the valve at the instant the suction heads come into operative position under the swatches in the supply magazines and the valve is closed to cut off the suction immediately following attachment of the swatches to the mounting sheets.

Sometimes it is desirable to apply but one swatch at a time. It will be observed from Figs. 15 and 16 that either of the suction heads may be readily removed. When one is removed, the suction outlet 134a therefor provided in the swinging arm must be closed. For that purpose, a device such as that shown in Fig. 17 may be employed. Said device comprises a yoke-like mounting member 191 fixed to the arm by the screws 136 and 137. In this case a layer of compressible material 140a is placed over the outer end of the duct 134a and against the adjacent edge of the arm. When the screws 137 and 136 are set tightly, the outer end of the suction outlet 134a will be sealed.

Swatch flattening mechanism

Figures 24, 25, 26:
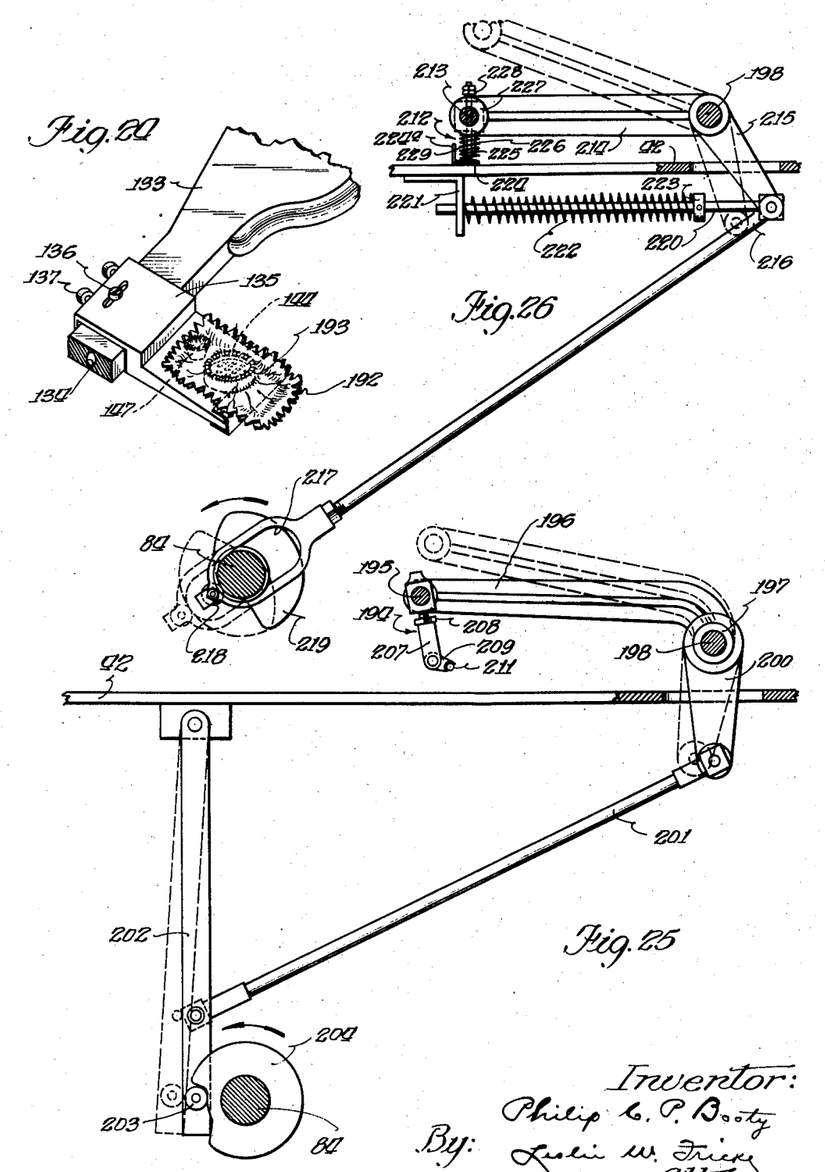
Fig. 24 is a perspective view of the outer end of the swinging arm and one of the suction heads illustrating the puckered condition of a swatch backed by a sheet of paper when it is gripped by the head.
Fig. 25 is a side elevational view of the cam operated mechanism employed for flattening a gripped swatch preparatory to being secured to the mounting sheet.
Fig. 26 is a side elevational view of the cam operated mechanism for pressing the free edge portion of a swatch onto a previously glued spot on the mounting sheet.

It will be appreciated that once the swatches are gripped by the suction heads they must not turn or slide relative thereto if the swatches are to be placed in alignment in the desired positions on the mounting sheets. It has been found necessary, therefore, to employ a vacuum of about 20 to 25 inches of mercury. It will be observed from Fig. 16 that the perforated disc 146 in the main suction opening is placed substantially below the upper edge of the ring 144. In removing the swatch from its receptacle the swatch and backing sheet of paper are drawn down substantially flat against the perforated disc 146, the air seal taking place between the swatch and the paper at the upper, inner corner or edge of the ring 144. The auxiliary suction opening 143, while not absolutely essential, does aid in preventing any sliding or skidding of the gripped swatch relative to the suction head. Under the conditions described, it will be appreciated that a swatch gripped by the suction head cannot be in a flat condition. On the contrary, due to the drawing of the swatch into the ring 144 and against the perforated disc 146 in the main suction opening the marginal portions of the swatch will be raised substantially and will be in a wrinkled or puckered condition. The puckered condition of a gripped swatch after it has been withdrawn from the supply magazine and while it is being transported to the swatch applying station is illustrated in Fig. 24. As shown, the rear portion of the swatch 192 and its backing sheet 193 are gripped at the main and auxiliary suction openings. The rear and side edges, and to some extent the front edge of the swatch and backing sheet, are turned upwardly and are wrinkled or puckered. I have found it highly desirable to employ means for flattening at least the forward, free or ungripped portion of the swatch and its backing sheet in order to guide them properly in under the presser foot mechanism which will be presently described.

The flattening mechanism is shown generally in Figs. 4, 5 and 18, and is specifically shown in detail in Figs. 25 and 27 to 29. The flattening devices 194 are fixed to a cross shaft 195, the ends of which are fixed in the outer ends of arms 196, the opposite ends of said arms being fixed to a sleeve 197 loose on a shaft 198 which is journaled in bearings 199 (Fig. 4). The means for raising and lowering the flattening devices includes an arm 200 (Fig. 25) fixed on the sleeve 197 and which projects through a slot in the table, the lower end of said arm being pivoted to one end of a link 201 and the other end of said link is pivoted to a lever 202. The upper end of the lever 202 is pivoted to a bracket mounted underneath the table 42 and the lower end of said link is provided with a roller 203 adapted to ride the edge or cam surface of a member 204 mounted on the cam shaft 84 (see also Fig. 6). As will be noted, the arms 196 are quite long and their weight, together with the weight of the flattening devices 194, tend always to hold the roller 203 against the edge of the cam member 204.

Each flattening device comprises a collar 205 fixed to the shaft 195, said collar having a threaded stud 206 which extends into and has threaded engagement with a member 207, a lock nut 208 being provided on said stud whereby said member 207 may be raised or lowered and locked in the desired adjusted position on the stud. The lower end of the member 207 is bifurcated (Fig. 29) to receive one end of a finger-like member 209, the latter being pivoted on a member 210 carried by and having threaded engagement with the member 207. By loosening and tightening the member 210, the member 209 may be set at any desired angular position with respect to the member 207. The lower end of member 209 has fixed to it a cross bar 211 and it is that cross bar that makes contact with the forward or free portion of the gripped swatch and its backing sheet preparatory to their passing under the presser foot presently to be described.

Figure 27:
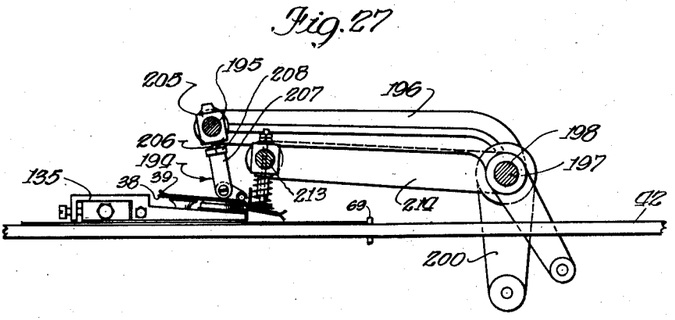
Fig. 27 is a side elevational view of a suction head and swatch gripped thereby flattened with the free edge of the swatch disposed under a pressure foot and about to be pressed against the mounting sheet.
Figure 28:
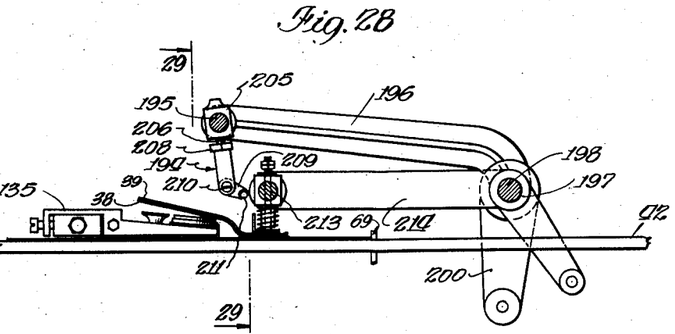
Fig. 28 is a view similar to Fig. 27 showing the operating parts in a changed relation, the free edge of the swatch being pressed against the mounting sheet.
Figure 29:
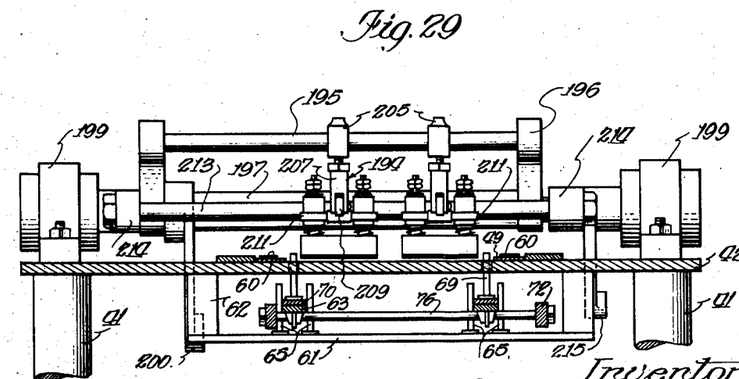
Fig. 29 is a sectional view taken on the line 29—29 of Fig. 28.

When the cross bar 211 of the flattening device is in operative position with respect to a gripped swatch and its backing sheet, the parts comprising the operating mechanism for the flattening device are in the relative positions shown in full lines in Figs. 25 and 27, and when the flattening device is raised out of contact with the swatch and its backing sheet the several parts of the operating mechanism are in the relative positions shown in dotted lines in Fig. 25 and in full lines in Fig. 28.

Swatch pressing means

The means for pressing the forward or free portions of the gripped swatches onto the glued spots of the mounting sheet is shown in Figs. 4, 5 and 18, and is illustrated in detail in Figs. 26 to 29. Pressure devices 212 are fixed on a cross bar 213 which is fixedly mounted at its ends in arms 214, the latter being fixedly carried by the shaft 198. The shaft 198 has one end of a lever 215 fixed to it, said lever extending through a slot provided in the table 42 and being connected at its lower end to the upper end of a link 216. The lower end of the link 216 is enlarged to provide a slot 217 adapted to receive the cam shaft 84, the lower extremity of the link carrying a roller 218 adapted to ride the cam surface or edge of a member 219 fixed on the cam shaft 84. For supplying pressure to the pressure devices 212 and for holding the roller 218 against the cam member 219, I have provided a rod 220 pivoted at one end at the junction between the lever 215 and the link 216, the other end of said rod 220 extending loosely through a bracket 221 mounted on the under side of the table 42. A compression spring 222 surrounds the rod 220 bearing at one end against the bracket 221 and at the other end against a collar 223 fixed to the rod 220.

In the embodiment illustrated, each pressure device 212 comprises a flanged plate 224 which has fixed to it two posts 225. Each post extends upwardly through a sleeve 226, a collar 227 and the shaft 213, the upper ends of the posts being threaded for lock nuts 228. The sleeve 226 is fixed to the collar 227 and the latter is fixed to the shaft 213. A compression spring 229 surrounds the sleeve 226 and bears at one end against the collar and at the other end against the upper surface of the plate 224. The lower end of the sleeve 226 terminates above the plate 224 so that swatches of various thicknesses may be accommodated. The openings through the shaft 213 for the posts 225 are somewhat larger than the posts, and the collars 227 may be adjusted and fixed by a set screw in the position desired. By setting the collars 227 at the desired angle on the cross shaft 213 and by adjusting the nuts 228, the pressure devices may be readily set to operate on either thin or thick swatches. The pressure devices are shown in operative position in Figs. 5, 18, 26 and 29, the relative positions of the parts comprising the operating mechanism therefor being shown in full lines in Fig. 26. When the pressure devices are in their raised or non-operative positions the relative positions of the parts of the operating mechanism are shown in dotted lines in Fig. 26.

Following the flattening of the forward or free portions of the gripped swatches by the flattening devices 194, the upstanding flanges 224a carried by the pressure plates 224 cooperate with the swatch guides 142 (Fig. 18) mounted on the forward edges of the suction heads to flatten further and smooth the free edges of the swatches, as shown in Fig. 27, with the result that the free or forward portions of the swatches are pressed firmly against the glued spots on the mounting sheets before the grip on the swatches has been released and the swatches are mounted in true alignment.

Operation

The catalog pages or other mounting sheets may be fed by hand or they may be supplied to the apparatus by any suitable feeding mechanism. In Fig. 4 a mounting sheet 230 is shown on the table at the glue applying station and a mounting sheet 231 is shown on the table at the swatch applying station. The tapes 49 carrying the mounting sheets travel at a speed so as to bring the mounting sheets against the stops at the respective stations shortly prior to the application of the glue and the swatches, it being understood that when the forward edges of the mounting sheets abut against the stops that the tapes will slip under the sheets until the stops are withdrawn. This insures the mounting sheets always being at the correct position on the table when the glue and the swatches are applied to them.

Assuming that there is a supply of swatches backed by sheets of paper or other material impervious to air in the supply magazines, that the air from the vacuum tank 164 has been sufficiently exhausted, that the mounting sheet 231 is about to be fed onto the traveling tapes 49 of the apparatus, and that the glue roller is covered with a film of glue received from its supply receptacle, the cam 110 controlling the glue applying mechanism will be in the position shown in full lines in Fig. 12. Applying power to the main drive shaft 44, the upper runs of the tapes 49 carrying the mounting sheet will travel from left to right and the cam 110 will move into the position shown in dotted lines in Fig. 12 with the result that the glue fingers will be moved upwardly from a position adjacent the table and turned over to bring the glue applying pads into contact with the glue roller. Continued operation of the apparatus will result in advancing the sheet 231 against the stops at the glue applying station and will return the glue fingers to their glue applying positions as shown in full lines in Fig. 10.

When the glue applying fingers are in operative position against a mounting sheet, the arm carrying the suction heads is at the swatch applying station as shown in Fig. 4. Continued operation of the machine causes the arm carrying the suction heads to be swung backwardly and the suction heads to be brought into firm contact with the swatches resting on the ledges at the bottoms of the supply magazines. At this instant the high surface of the cam 190 (Fig. 23) engages the roller 189 which swings the lever 188 to the right, causing the plunger of the valve 181 to be unseated and suction to be applied to the chambers 138 of the suction heads (Fig. 16) and through the suction openings 142 and 143 to the swatches and the sheets of paper directly back of them. The swatches are drawn straight downwardly from the supply magazines, one at a time only by each head, and the swinging arm moves toward the swatch applying station. Shortly after the swinging arm carrying the suction heads starts its backward excursion the high surface of the cam 83 (Fig. 3) comes into engagement with the roller 80a of the stop mechanism with the result that the inner ends of the stop frames 72 and 73 are raised against the tension of the spring 93 and the outer ends of said frames are lowered which permit the bars carrying the stops to descend by gravity even with or slightly below the top surface of the table 42. The low surface on the cam 83 eventually reaches the roller 80a with the result that the stops are raised and those at the swatch applying station are in position to check movement of the mounting sheet to which glue has been applied when it arrives at said station.

As the suction heads and the swatches gripped thereby approach the swatch applying station, the swatch flattening means and the devices for pressing the forward or free edges of the swatches down gradually descend into working position. The cam 204 (Fig. 25) is set on the shaft 84 so that the bars 211 will bear against the puckered upturned free or forward portions of the swatches and push said portions down sufficiently to pass forwardly and under the plates 224 of the pressure devices, the cam 219 (Fig. 26) being set on the cam shaft 84 so as to effect that result. At this moment the relative positions of the swatches, the flattening devices and the pressure devices are substantially as shown in Fig. 27. The plates 224 of the pressure devices press the flattened and free or forward portions of the swatches, which it will be noted extend a substantial distance forward of the suction heads, downwardly and into firm contact with the glued spots on the mounting sheet. Immediately after the free forward portions of the swatches are under the control of the pressure devices, the roller 189 (Fig. 23) drops back against the low portion of the cam 190 which instantly permits the plunger of the valve 181 to cut off the suction and immediately the arm carrying the suction heads begins its return excursion for more swatches. The relative positions of the flattening and pressure applying devices, following the cutting off of the suction, is shown in Fig. 28.

It will be understood that while one sheet is advancing to the swatch applying station, another sheet is advancing to the glue applying station. The timing of the various mechanisms is such that glue is applied to one sheet at substantially the same instant the swatches are applied to the sheet just ahead.

In the operation of the apparatus, there should be no failure of a suction head to grip a single swatch on each excursion and remove it from its supply magazine. It will be appreciated that when there are two or more suction heads on the swinging arm that the failure of one head to grip a swatch and seal its suction openings will result in failure of the other head or heads to maintain their grip on their swatches because of the resulting leakage in the suction line. It is necessary, therefore, to maintain the swatches in their supply magazines under sufficient pressure to keep them properly arranged, and in particular to insure that the swatches in the stacks just above those being withdrawn are not pulled down to any substantial extent. I have found that the character of the material used at the backs of the swatches has a great deal to do with the successful operation of the apparatus.

I prefer to use paper at the backs of the swatches because of its cheapness. While the paper should be thin so that it will readily flex with the swatches under the action of the suction medium it should nevertheless be impervious thereto. When swatches of silk, rayon, or other fabrics having relatively smooth surfaces are to be applied it makes little difference whether the backing sheets be smooth or rough on one or both sides. However, when the swatches have woolly or relatively rough surfaces, I have found it highly desirable to use backing sheets, the upper surfaces of which are glazed or quite smooth. The reason for this will be readily appreciated. A stack of swatches in a supply magazine resting on the ledges at the bottom and under substantial weight separated by sheets of paper relatively smooth on their top sides are readily gripped and pulled down over the ledges away from the swatch just above without wrinkling or disturbing the same to any substantial extent. The smooth top surface of the paper backing, when gripped with the swatch therebelow, readily slides over the bottom surface of the swatch directly thereabove even if the swatch is of a woolly or rough texture.

Upon the pressure devices 212 being raised from the applied swatches the backing sheets of paper are immediately freed. These sheets of paper are of no further use and may be removed out of the way by any suitable means such as suction or by blowing them away with a blast of air.

While I prefer to employ the constructions and arrangements illustrated in my drawings and above described, it is to be understood that my invention is not limited thereto except so far as the claims may be so limited, it being understood that changes might well be made in the form and arrangement of the parts without departing from my invention.

I claim:

1. In the herein described method of mounting a swatch of porous material to a catalog sheet or the like, the steps of gripping the swatch by applying suction to one face thereof while a sheet of material impervious to the suction medium is positioned against the other face thereof, transporting the gripped swatch to the desired position on the mounting sheet, and then securing the swatch to the mounting sheet.

2. In the herein described method of mounting a swatch of porous material to a catalog sheet or the like, the steps of gripping the swatch by applying suction to one face of a portion thereof while a sheet of material impervious to the suction medium is positioned against the opposite face of said swatch portion, transporting the gripped swatch to the desired position on the mounting sheet, and then securing the free portion of the swatch to the mounting sheet.

3. In the herein described method of mounting a swatch of porous material to a catalog sheet or the like, the steps of gripping the swatch by applying suction to one face thereof while a sheet of material impervious to the suction medium is positioned against the other face thereof, transporting the gripped swatch to the desired position on the mounting sheet, securing the gripped swatch to the mounting sheet, and then releasing the grip on the swatch by discontinuing the suction.

4. In the herein described method of mounting a swatch of porous material to a catalog sheet or the like, the steps of gripping the swatch by applying suction to one face of a portion thereof while a sheet of material impervious to the suction medium is positioned against the opposite face of said swatch portion thereby drawing the swatch into a puckered condition, transporting the gripped swatch to the desired position on the mounting sheet and flattening the free portion of the swatch, and then securing said free swatch portion to the mounting sheet.

5. In the herein described method of mounting swatches of porous material to catalog sheets or the like with the aid of suction, the steps of stacking the swatches alternately with sheets of material impervious to the suction medium, then gripping the swatches by applying suction to the exposed faces of the swatches successively positioned at one end of the stack, transporting the gripped swatches to the desired positions on the sheet or sheets on which they are to be mounted, and securing the swatches to their mounting sheet or sheets.

6. In the herein described method of mounting swatches of porous material to catalog sheets or the like with the aid of suction, the steps of stacking against spaced ledges and under pressure alternately the swatches and sheets of material smooth on one side and impervious to the suction medium with the smooth faces of the latter sheets facing away from the ledges, then gripping the swatches by applying suction to the exposed faces of the swatches successively positioned at one end of the stack against the ledges, transporting the gripped swatches to the desired positions on the sheet or sheets on which they are to be mounted, and securing the swatches to their mounting sheet or sheets.

7. In the herein described method of mounting a swatch of porous material to a catalog sheet or the like, the steps of gripping the swatch by applying suction to one face of a portion thereof while a sheet of material impervious to the suction medium is positioned against the opposite face of said swatch portion, applying glue to a spot on the mounting sheet, transporting the gripped swatch to the glued spot on the mounting sheet, and then pressing the free portion of the swatch on the glued spot of the mounting sheet.

8. In apparatus for mounting swatches of porous material on catalog or other mounting sheets, the combination of a head having a suction opening, means for moving said head to bring its said opening into contact with one face of a swatch while its other face is backed by a sheet of material impervious to the suction medium, means for applying suction through said opening to the swatch and impervious sheet, means for moving said head and the swatch gripped thereby to a position over a mounting sheet, and means for securing the swatch to the mounting sheet.

9. In apparatus for mounting swatches of porous material on catalog or other mounting sheets, the combination of a head having a suction opening, a magazine for holding a plurality of swatches stacked alternately with sheets of a material impervious to the suction medium, means for moving said head to bring its said opening into contact with the exposed face of a swatch on one end of the stack, means for applying suction through said opening to the swatch and impervious sheet therebehind to grip the swatch, means for moving said head and the gripped swatch to a position over a mounting sheet, and means for securing the swatch to the mounting sheet.

10. In apparatus for mounting swatches of porous material on catalog or other mounting sheets, the combination of a head having a suction opening, a magazine provided at one end with spaced ledges, said magazine being adapted to hold a plurality of swatches stacked alternately with sheets of a material impervious to the suction medium, means bearing against one end of the stack for holding the swatch at the other end of the stack against said ledges, means for moving said head to bring its said opening between said ledges into contact with the exposed face of the swatch bearing against said ledges, means for applying suction through said suction opening to the swatch and impervious sheet therebehind to grip the swatch, means for moving said head and the gripped swatch to a position over a mounting sheet, and means for securing the swatch to the mounting sheet.

11. In apparatus for mounting swatches of porous material on catalog or other mounting sheets, the combination of a head having a suction opening, means for moving said head to bring its said opening into contact with one face of a swatch while its other face is backed by a thin flexible sheet of material impervious to the suction medium, means for applying suction through said suction opening to the swatch and impervious sheet thereby drawing the swatch into a puckered condition and gripping it, means for moving said head and the gripped swatch to a position over a mounting sheet, means for flattening at least a portion of the swatch, and means for securing the flattened swatch portion to the mounting sheet.

12. In apparatus for mounting swatches of porous material on catalog or other mounting sheets, the combination of a head having a suction opening, means for moving said head to bring its said opening into contact with one face of a portion of a swatch while the other face of the swatch portion is backed by a thin flexible sheet of material impervious to the suction medium, means for applying suction through said suction opening to the swatch and impervious sheet thereby drawing the swatch into a puckered condition and gripping it, means for moving said head and the gripped swatch to a position over a mounting sheet, means for flattening the free portion of the swatch, and means for securing the free portion of the swatch to the mounting sheet.

13. In apparatus for mounting swatches of porous material on catalog or other mounting sheets, the combination of an arm swingable about an axis substantially perpendicular to a mounting sheet, a head having a suction opening and attached to said arm, a magazine for holding a plurality of swatches stacked alternately with sheets of material impervious to the suction medium, means for swinging said arm to move the suction opening of said head into contact with the exposed face of a swatch on one end of the stack, means for applying suction through said suction opening to the swatch and impervious sheet therebehind to grip the swatch, means for swinging said arm and head to bring the gripped swatch to a position over the mounting sheet, and means for securing the swatch to the mounting sheet.

14. In apparatus for mounting swatches of porous material on catalog or other mounting sheets, the combination of a supporting table for a mounting sheet, an arm swingable over said table, a head having a suction opening and attached to said arm, a magazine disposed above said table for holding a plurality of swatches stacked alternately with sheets of a material impervious to the suction medium, means for swinging and raising said arm to bring the suction opening of said head into contact with the exposed face of the lowermost swatch in said magazine, means for applying suction through said suction opening to the swatch and impervious sheet therebehind to grip the swatch, means for lowering and swinging said arm to remove the gripped swatch from said magazine and to bring it to a position over the mounting sheet, and means for securing the swatch to the mounting sheet.

15. In apparatus for mounting swatches of porous material on catalog or other mounting sheets, the combination of a supporting table for a mounting sheet, an arm swingable over said table, a head having a suction opening and attached to said arm, a magazine disposed above said table for holding a plurality of swatches stacked alternately with sheets of a material impervious to the suction medium, means for swinging and raising said arm to bring the suction opening of said head into contact with the exposed face of the lowermost swatch in said magazine, means for applying suction through said suction opening to the swatch and impervious sheet therebehind to grip the swatch, means for lowering said arm to remove the gripped swatch from said magazine, means for swinging said arm to bring the gripped swatch into the desired position over the mounting sheet, means for lowering further the arm to bring a portion of the swatch closer to the mounting sheet, and means for securing said swatch portion to the mounting sheet.

16. In apparatus for mounting swatches of porous material on catalog or other mounting sheets, the combination of a head having a suction opening, means for moving said head to bring its said opening into contact with one face of a swatch while its other face is backed by a sheet of material impervious to the suction medium, means for applying suction through said suction opening to the swatch and impervious sheet, means for applying glue to a spot on the mounting sheet, means for moving said head to bring the swatch over the glued spot on the mounting sheet, and means for pressing the swatch on the glued spot of the mounting sheet.

17. In apparatus for mounting swatches of porous material on catalog or other mounting sheets, the combination of a head having a suction opening, means for moving said head to bring its said opening into contact with one face of a swatch while its other face is backed by a thin flexible sheet of material impervious to the suction medium, means for applying suction through said suction opening to the swatch and impervious sheet thereby drawing the swatch into a puckered condition and gripping it, means for applying glue to a spot on the mounting sheet, means for moving said head to bring the swatch over the glued spot on the mounting sheet.

18. In apparatus for applying glue at one station and swatches at another station to catalog or other mounting sheets while on a sheet supporting table, the combination of means for moving the sheets successively across the table and means for stopping the sheets at the respective stations comprising a stop finger at each station extending upwardly through an opening in the table, a horizontal bar vertically movable under the table and carrying said fingers, two levers disposed end to end and intermediately pivoted, said levers at their adjacent or inner ends having a lost motion connection and at their outer ends carrying means for supporting said bar, means for moving said levers to bring the stop fingers into operative position, and means for moving the levers to bring the stop fingers into inoperative position.

19. In apparatus for applying glue at one station and swatches at another station to catalog or other mounting sheets while on a sheet supporting table, the combination of means for moving the sheets successively across the table and means for stopping the sheets at the respective stations comprising a pair of stop fingers at each station extending upwardly through openings in the table, two horizontal bars vertically movable under the table, each of said bars carrying one of each pair of said stop fingers, two frames disposed end to end and intermediately pivoted, said frames at their adjacent or inner ends having a lost motion connection and at their outer ends carrying means for supporting said bars, means for moving said frames to bring the stop fingers into operative position, and means for moving the frames to bring the stop fingers into inoperative position.

20. In apparatus for gripping and removing swatches singly from a supply receptacle elevated with respect to a table and for transporting them to catalog or other mounting sheets on the table, the combination of a vertical stationary post, a sleeve oscillatable and slidable on said post, an arm fixed to said sleeve and carrying swatch gripping means, means for oscillating said sleeve to swing said arm backwardly and forwardly to bring its swatch gripping means from a position under the supply receptacle to a position over a mounting sheet, means for raising the sleeve on said post to bring the swatch gripping means into operative contact with the lowermost swatch in the supply receptacle, and means for lowering the sleeve on said post to bring a portion of a swatch carried by said gripping means into contact with the mounting sheet.

21. In apparatus for gripping and removing swatches singly from a supply receptacle elevated with respect to a table and for transporting them to catalog or other mounting sheets on the table, the combination of a vertical stationary post, a sleeve oscillatable and slidable on said post, an arm fixed to said sleeve and carrying swatch gripping means, a gear fixed to said sleeve, an oscillatable segmental gear driving member meshing with said sleeve gear for swinging said arm backwardly and forwardly to bring its swatch gripping means from a position under the supply receptacle to a position over a mounting sheet, an arm journaled but non-shiftable on said sleeve and held at its other end against turning with the sleeve, and a driven cam member the cammed surface of which is engaged by said last named arm whereby said first named arm is raised to bring the swatch gripping means into operative contact with the lowermost swatch in the supply receptacle and is lowered to bring a portion of a swatch carried by said gripping means into contact with the mounting sheet.

22. In apparatus for gripping and transporting to a position over a catalog or other mounting sheet a swatch in a wrinkled condition, the combination of means including a head for applying suction to a portion of the swatch, means for moving the head and a swatch gripped thereby to a position over a mounting sheet, and means for flattening the free portion of the swatch preparatory to securing the same to the mounting sheet.

23. In apparatus for gripping and transporting to a position over a catalog or other mounting sheet a swatch in a wrinkled condition, the combination of means including a head for applying suction to a portion of the swatch, means for moving the head and a swatch gripped thereby forwardly to the position desired over a mounting sheet, and means bearing on and under which the forwardly moving free portion of the swatch slides for flattening said portion preparatory to securing it to the mounting sheet.

24. In apparatus for gripping and transporting to a position over a catalog or other mounting sheet a swatch in a wrinkled condition and for securing at least a portion of the swatch in a flat condition to the mounting sheet, the combination of means including a head for applying suction to a portion of the swatch, means for moving the head and a swatch gripped thereby to the desired position over a mounting sheet, means for effecting a flattening operation to the free portion of the swatch preparatory to securing said portion to the mounting sheet, and means for pressing said free swatch portion against the mounting sheet while securing the same thereto.

25. In apparatus for gripping and transporting to a position over a catalog or other mounting sheet a swatch in a wrinkled condition and for securing at least a portion of the swatch in a flat condition to the mounting sheet, the combination of means including a head for applying suction to a portion of the swatch, means for moving the head and a swatch gripped thereby forwardly to the desired position over a mounting sheet, means for pressing the free portion of the swatch against the mounting sheet and holding it while said portion is attached to the sheet, and means for guiding the free portion of the forwardly moving swatch under said pressure means.

26. In apparatus for gripping and removing swatches singly from a supply receptacle elevated with respect to a table and for transporting them to catalog or other mounting sheets on the table, the combination of a fixed vertical post, an arm oscillatably and slidably mounted on said post and carrying swatch gripping means, means for swinging said arm to bring its swatch gripping means from a position under the supply receptacle to a position over a mounting sheet, means for sliding said arm along said post in one direction to bring the swatch gripping means into positive contact with the lowermost swatch in said supply receptacle, and means for sliding said arm along said post in the opposite direction to bring a portion of a swatch carried by said gripping means into contact with the mounting sheet.

PHILIP C. P. BOOTY.